March 12, 1957 — R. C. QUACKENBUSH — 2,784,616
FEED CONTROL ATTACHMENT FOR HAND TOOLS
Filed Nov. 29, 1954 — 2 Sheets-Sheet 1
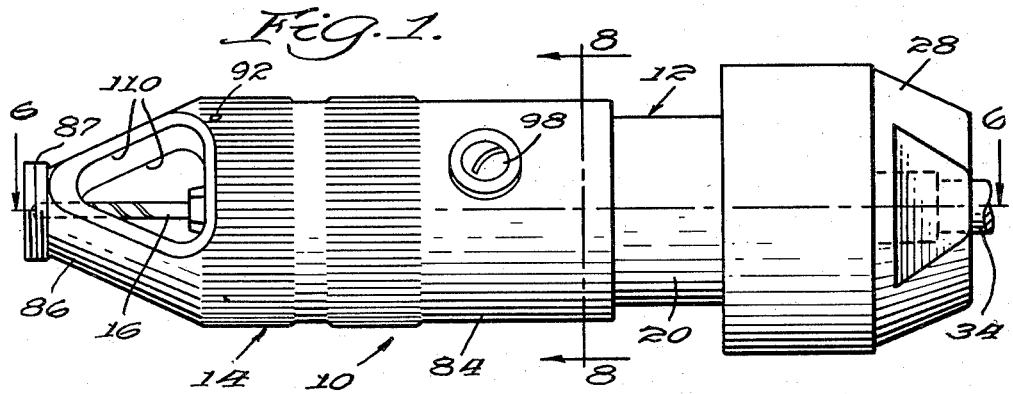
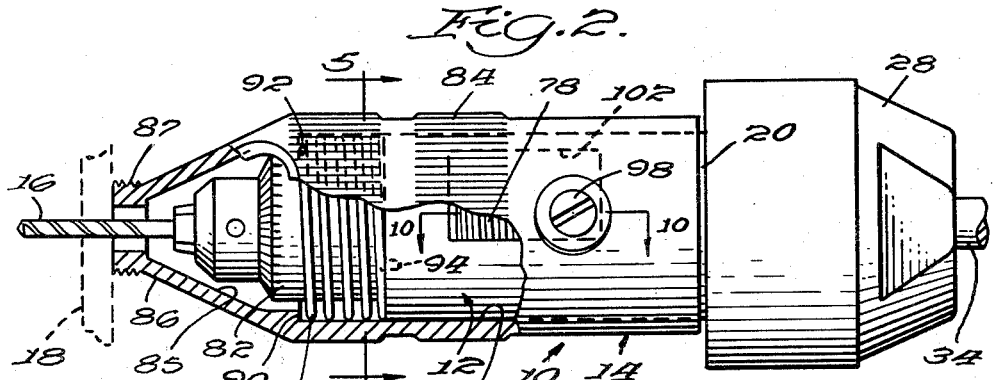
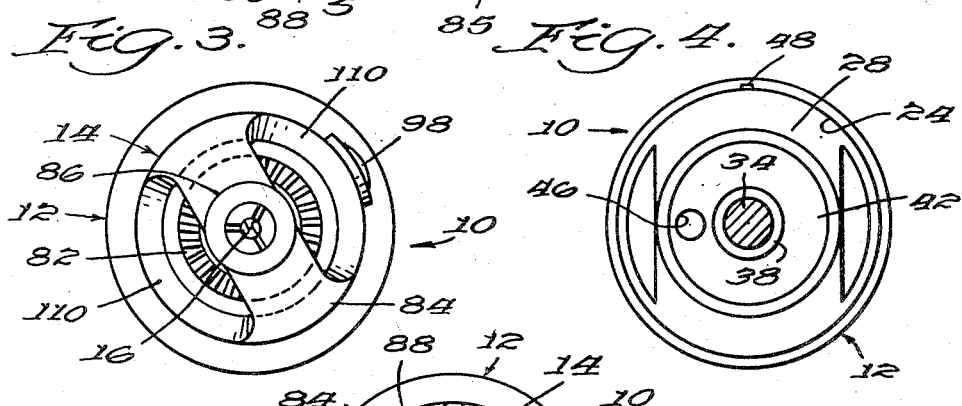
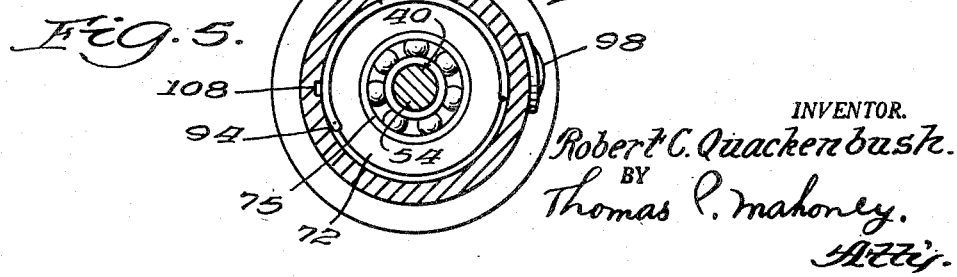
INVENTOR.
Robert C. Quackenbush
BY Thomas P. Mahoney
Att'ys.

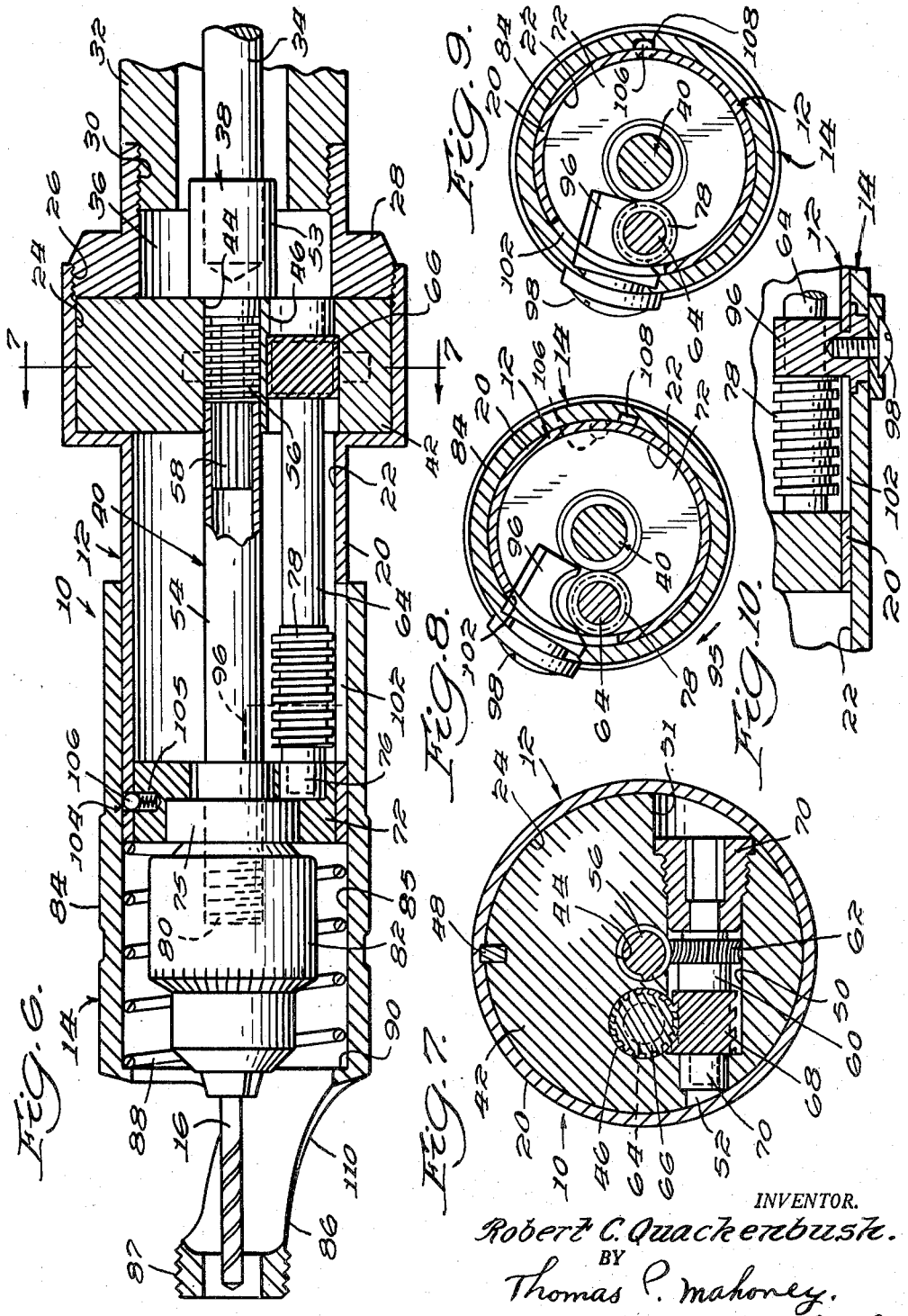

United States Patent Office 2,784,616
Patented Mar. 12, 1957

2,784,616

FEED CONTROL ATTACHMENT FOR HAND TOOLS

Robert C. Quackenbush, San Fernando, Calif.

Application November 29, 1954, Serial No. 471,570

10 Claims. (Cl. 77—34.4)

This invention relates to an attachment for hand tools and, more particularly, to an attachment for hand tools adapted to feed a cutting tool, such as a drill bit, mounted in a hand tool into a work piece at a predetermined rate of speed at a fixed ratio to the speed or rotation of the cutting tool as induced by the hand tool.

Although I disclose the invention as embodied in an attachment for hand tools, it is conceivable that the principles of the invention may be applied with equal cogency to attachments for other than hand tools, such as fixedly mounted drill presses and the like.

In recent years the problem of hand drilling hard materials, such as the stainless steels and the hardened aluminums, has increased due to the increased utilization of these harder materials in such fields as aircraft and in a variety of other uses. In the first place, the pressure which must be exerted upon the work piece by the worker holding a hand tool utilized to cause a drill bit or other cutting tool to enter the work piece is substantial and in direct proportion to the hardness of the material embodied in the work piece. As a result, premature fatigue of the worker results and, in many applications, women workers cannot be utilized because the amount of pressure that has to be exerted upon the work piece is in excess of their strength.

It is, therefore, an object of my invention to provide a cutting tool feeding attachment for hand tools by which the cutting tool is fed into the material of the work piece at a predetermined rate controlled by the speed of rotation of the drive shaft on which the cutting tool is mounted.

In describing the construction and operation of the attachment of my invention hereinbelow, the cutting tool will be referred to as a drill bit but it should be understood that any analogous cutting tool may be utilized in substitution for the drill bit.

In drilling the harder materials mentioned above, when excessively high or low pressures are exerted upon the hand tool and thus upon the drill bit, premature dulling and, frequently, breakage of the tool bit results and there is a high tool maintenance and replacement cost incidental to the use of harder materials in work pieces and drilling thereof by conventional methods.

A further object of my invention is the provision of an attachment of the aforementioned character whereby the drill bit is fed into the material constituting the work piece at a predetermined rate and, therefore, at an optimum rate so that premature dulling of the drill bit or breakage thereof is avoided. Furthermore, damage to the work piece resulting from excessively high or low pressures exerted upon the work piece by the drill bit is eliminated.

An additional object of my invention is the provision of an attachment of the aforementioned character which will permit the utilization of the hand tool upon which it is mounted and, more particularly, the drill bit utilized therewith in a conventional fashion without necessitating the demounting of the attachment from the hand tool with which it is associated.

Another object of my invention is the provision of an attachment of the aforementioned character which includes drill feeding means movable between inoperative and operative positions, the drill feeding means when in the inoperative position permitting the utilizaton of the hand tool and the drill bit mounted therein in conventional fashion, but when moved into operative position serving to control the feeding of the drill bit into the material of the work piece at a predetermined rate.

A further object of my invention is the provision of an attachment of the aforementioned character wherein the rate at which the drill bit is fed into the material of the work piece by the attachment is not susceptible to fluctuations in power supply, as is frequently the case in pneumatically energized conventional drill feeding devices.

Another object of my invention is the provision of an attachment of the aforementioned character which can be readily mounted upon or dismounted from a conventional hand tool so that when the continued need for the drill feeding attachment has passed the operator can remove the attachment and substitute the conventional components of the hand tool therefor.

Other objects and advantages of my invention will be apparent from the following specification and the accompanying drawings which are for the purpose of illustration only and in which:

Fig. 1 is a side elevational view of an attachment constructed in accordance with the teachings of my invention showing the drill feeding means thereof disposed in its first outermost position;

Fig. 2 is a view similar to Fig. 1 showing the drill feeding means of the attachment disposed in its second innermost position;

Fig. 3 is a front end elevational view of the attachment;

Fig. 4 is a rear end elevational view of the attachment;

Fig. 5 is a vertical sectional view taken on the broken line 5—5 of Fig. 2;

Fig. 6 is a vertical sectional view taken on the broken line 6—6 of Fig. 1;

Fig. 7 is a vertical sectional view taken on the broken line 7—7 of Fig. 6;

Fig. 8 is a vertical sectional view taken on the broken line 8—8 of Fig. 1;

Fig. 9 is a view similar to Fig. 8 but showing the drill feeding means of the attachment disposed in operative relationship with the main drive shaft of the attachment prior to the automatic feeding of a drill bit into a work piece; and Fig. 10 is a longitudinal sectional view taken on the broken line 10—10 of Fig. 2.

Referring to the drawings and particularly to Figs. 1–2 and 6 thereof, I show a drill feeding attachment 10 constructed in accordance with the teachings of my invention and incorporated in a housing 12. The housing 12 has drill feeding means 14 supported thereupon and designed to determine the rate at which a drill bit 16 or other cutting tool is fed into a work piece 18.

The housing 12 is constituted by an elongated substantially cylindrical body 20, said body defining a chamber 22 and having integrally formed therewith at its inner extremity an enlarged annular recess 24 the wall of which is threaded, as at 26, for the reception of an adapter collar 28, best shown in Fig. 6 of the drawings.

The inner extremity of the adapted collar 28 is threaded, as at 30, and is adapted to be received upon a similarly threaded portion provided on a hand tool 32, as best shown in Fig. 6 of the drawings. Therefore, by providing adapter collars 28 having different diameter threads in the location of the threads 30 to co-operate with mating ends of hand tools, it is possible to mount the attachment 10 on a wide variety of conventional hand tools with a minimum of effort.

The hand tool 32, as best shown in Fig. 6 of the drawings, includes a drive shaft 34 which extends outwardly into a bore 36 defined by the adapter collar 28 and has its outermost extremity received in a socket 38 provided on the innermost end of a composite main drive shaft 40 constituting a part of the attachment 10.

Mounted in the socket 24 provided on the inner extremity of the body 20 is a gear reducer housing 42, said housing being provided with an axial bore 44 and a parallel auxiliary bore 46, as best shown in Figs. 6 and 7 of the drawings. A key 48 is interposed between the inner wall of the recess 24 and the periphery of the gear reducer housing 42, as best shown in Fig. 7 of the drawings, to locate the gear reducer housing 42 in a predetermined position with respect to the recess 24.

A transverse bore 50 is, as best shown in Fig. 7 of the drawings, provided in the gear reducer housing 42, said transverse bore extending from one side to the other of said gear reducer housing and underlying the axial bore 44 and the auxiliary bore 46. An opening 51 in the wall of the transverse bore 50 permits communication to be established between the axial bore 44 and the transverse bore 50 and a second opening 52 in said wall of said transverse bore permits communication to be established between the auxiliary bore 46 and said transverse bore, as best shown in Fig. 7 of the drawings.

The main drive shaft 40 is constituted by first and second sections 53 and 54, respectively, as best shown in Fig. 6 of the drawings, said first section including the socket 38 and an intermediate worm gear 56 upon the periphery thereof. Formed integrally with the outermost end of the first section 53 is a male spline 58 which fits within a mating female spline provided within the inner extremity of the second section 54 of said main drive shaft.

A transversely oriented speed reducer shaft 60 is located in the transverse bore 50 and has a pinion 62 mounted thereupon engageable with the worm gear 56 which extends through the opening 51 into the transverse bore 50.

An auxiliary drive shaft 64 has its inner extremity mounted for rotation in the auxiliary bore 46 and supports in said auxiliary bore a driven gear 66 which extends through the opening 52 in the wall of the transverse bore 50 to engage a driving gear 68 mounted upon the reducer shaft 60 and rotatable thereby concomitantly with the rotation of the pinion 62. The opposite ends of the reducer shaft 60 are mounted in bearings 70 located in the opposite ends of the transverse bore 50.

A partition 72 is located within the chamber 22 at one end of the cylindrical body 20 constituting the housing 12 and supports the second section 54 of the main drive shaft 40 intermediate its ends. Provided in the partition 72 is a chuck bearing 75 which supports the periphery of the second section 54 of the main drive shaft 40 and sustains the loads imposed thereupon during the operation of the attachment by the drill bit 16. The outermost end of the auxiliary shaft 64 is also supported in the partition 72 by means of a bearing 76.

Formed upon the periphery of the auxiliary shaft 64 is a lead screw 78, said lead screw being located adjacent the bearing 76 in the partition 72. Obviously, therefore, as rotation of the drive shaft 34 of the hand tool takes place, concomitant rotation of both the first and second sections 53 and 54 of the main drive shaft 40 will occur. The rotation of the first section 53 of the main drive shaft 40 causes rotation of the worm gear 56 provided intermediate the ends thereof and, consequently, rotation of the pinion 62 in mesh with the worm gear 56 and located in the transverse bore 50. Rotation of the pinion 62 causes concomitant rotation of the driving gear 68 to rotate the driven gear 66 mounted on the auxiliary drive shaft 64 and simultaneous rotation of the lead screw 78 on the auxiliary shaft 64 will occur.

Because the various gears incorporated in the gear reducer housing 42 accomplish a substantial reduction in the speed of rotation of the auxiliary drive shaft 64, the speed at which the lead screw 78 mounted thereupon is rotated is substantially less than that of the main drive shaft.

The second section 54 of the main drive shaft is provided with a thread 80 on its outermost end, as best shown in Fig. 6 of the drawings, and engages the body of a conventional chuck 82 to cause the rotation of the same. Of course, the chuck 82 mounts the drill bit 16 in a conventional manner.

Supported on the housing 12 of the attachment and constituting a portion of the drill feeding means 14 is an elongated cylindrical sleeve 84 which provides a chamber 85 for the reception of the drill chuck 82, as best shown in Figs. 2 and 6 of the drawings. A pressure foot 86 is formed integrally with the outermost end of the sleeve 84 and has a thread 87 on its periphery for the engagement of a bushing or other attachment utilized while drilling the work piece 18.

Disposed within the chamber 85, as best shown in Figs. 2 and 6 of the drawings, is a compression-portion spring 88 one end of which is seated on a shoulder 90 provided at the forward extremity of the sleeve 84 and the opposite end of which is seated against the partition 72 in the housing 12. To permit the spring 88 to act as a torsion spring, the outermost end thereof is secured in an opening 92 in the sleeve 84, as best shown in Fig. 2 of the drawings, while the inner end of said spring is secured, as best shown in Fig. 5 of the drawings, in an opening 94 in the partition 72. The spring 88 thus serves two functions, by virtue of its compression it serves to locate the sleeve 84 in a first, outermost position as best shown in Figs. 1 and 6 of the drawings wherein the pressure foot is disposed in overlying relationship with the end of the drill bit 16 for engagement with a work surface prior to the feeding of the drill into the material of the work piece 18. In addition, as will be described in greater detail below, the spring 88 rotates the sleeve 84 in a clockwise direction as indicated by the arrow 95 in Fig. 8 of the drawings.

A half lead nut 96 is, as best shown in Figs. 8–10 of the drawings, supported for movement by the sleeve 84 on a screw 98 into engagement with the periphery of the lead screw 78 on the auxiliary shaft 64. The half nut 96, as best shown in Figs. 2 and 8–9 of the drawings, extends through an elongated slot 102 in the wall of the housing 12 to permit said nut to be moved into operative relationship with the lead screw 78 provided on the auxiliary drive shaft 64. Detent means 104 is provided in a bore 105 extending from the partition 72 through the wall of the housing 12.

The detent means 104 is constituted by a spring-biased detent ball 106, as best shown in Figs. 6 and 8–10 of the drawings. Formed in the interior wall of the sleeve 84 is a recess 108, Figs. 8–9, which is engageable by the ball detent 106 to maintain the sleeve 84 in its second operative position, as will be described in greater detail hereinbelow.

The operation of the attachment 10 of my invention is as follows:

The attachment is installed on the forward end of the hand tool 32 by threading the adapter collar 28 upon the threads provided on said forward end of the hand tool 32. In installing the attachment 10 on the hand tool 32, a threaded connection is established between the drive shaft 34 of the hand tool and the socket 38 provided on the innermost end of the main drive shaft 40 of the attachment 10.

A drill bit 16 is installed in the chuck 82 of the attachment 10, access being had to the chuck 82 through openings 110 provided in the pressure foot 86 on the elongated cylindrical sleeve 84. As pointed out previously, it is possible to utilize the attachment on a hand tool in drilling holes with the drill bit 16 in a conventional fashion. For instance, the spring 88, as best shown in Figs. 1 and 6 of the drawings, normally urges the cylindrical sleeve 84 into its outermost position wherein the end of the drill bit 16 is disposed within the pressure foot 86. When drilling in the conventional fashion, the operator need merely place the pressure foot 86 against the work piece 18 and feed the drill bit 16 into the work piece in the same manner as would be accomplished if the drill bit were mounted in a chuck on the hand tool 32 rather than in the chuck 82 of the attachment 10.

When drilling in this conventional fashion, as the drill bit 16 enters the work piece 18, the pressure foot 86 and thus the sleeve 84 on which the pressure foot is formed is urged backwardly against the bias of the spring 88 until the drill bit 16 penetrates the work and said bit is removed from a hole formed in the work piece 18 thereby. When the drill bit 16 is so removed and the pressure foot 86 freed from the work piece 18, the sleeve 84 returns to the outermost position shown in Figs. 1 and 6 of the drawings.

On the other hand, when it is intended to utilize the attachment 10 for its function of feeding the drill bit 16 into the work piece 18 at a predetermined rate, the sleeve 84 is rotated about its axis by grasping the same on the knurled portions thereof and rotating it in a counterclockwise direction to bring the half lead nut 96 mounted thereupon into operative engagement with the lead screw 78 provided upon the periphery of the auxiliary drive shaft 64. As previously pointed out, the torsional effect of the spring 88 only maintains the sleeve 84 in a first inoperative position wherein the half lead nut 96 is disposed out of engagement with the lead screw 78 provided on the auxiliary drive shaft 64, as best shown in Fig. 8 of the drawings. Therefore, the sleeve 84 must be rotated in a counterclockwise direction into the second operative position shown in Fig. 9 of the drawings wherein the half lead nut 96 engages the lead screw 78.

When rotated into the second operative position, the sleeve 84 is maintained in said second operative position by means of the detent means 104, the ball detent 106 thereof being urged into the recess 108 in the interior of the sleeve 84, as best shown in Fig. 9 of the drawings. In this manner, the detent means 104 in co-operative relationship with the recess 108 in the sleeve 84 serves to maintain said sleeve and thus the half nut 96 in operative engagement with the lead screw 78 on the auxiliary drive shaft 64.

After the sleeve 84 is rotated into the second operative position, the motor of the hand tool 32 is energized with the pressure foot 86 imposed on the surface of the work piece 18 and the drill bit 16 located in the place where a hole is to be formed in the work piece 18. Starting of the motor of the hand tool 32 causes rotation of the drive shaft 34 thereof and concomitant rotation of the main drive shaft 40 of the attachment 10. When the main drive shaft 40 of the attachment 10 rotates, the rotation of the worm gear 56 provided on the first section 53 of said main drive shaft occurs to cause the simultaneous rotation of the gears 62, 68, and 66 in that order and thus to cause the concomitant rotation of the auxiliary drive shaft 70 and the lead screw 78 provided upon the periphery thereof.

Since the travel half nut 96 has already been moved into engagement with the lead screw 78, rotation of the lead screw 78 will cause concomitant, longitudinal movement of the traveling nut 96 and the sleeve 84 upon which said nut is mounted to cause inward movement of the nut upon the lead screw 78. Since the speed of rotation of the drive shaft 64 is substantially less than that of the main drive shaft 40 due to the change in the gear ratio provided by the gear train in the gear reducer housing 42, the inward movement of the sleeve 84 from the outermost position shown in Fig. 1 of the drawings to the innermost position thereof shown in Fig. 2 of the drawings is very gradual and can be controlled by varying the sizes of the gears in the gear reducer housing 42.

When the sleeve 84 reaches the innermost position shown in Fig. 2 of the drawings, the traveling nut 96 reaches the end of the lead screw 78 but is maintained in the position shown in Fig. 10 of the drawings out of engagement with but directly behind the lead screw 78 so that continued rotation of the drive shaft 40 and the auxiliary drive shaft 64 will not cause the jamming of the traveling nut 96. Until the sleeve 84 is rotated into the first inoperative position wherein the spring-biased ball detent 106 leaves the recess 108, the sleeve will be maintained in the second innermost position. However, by rotation of the sleeve 84 into the first inoperative position the spring 88 will be free to bias the sleeve 84 into the outermost position shown in Figs. 1 and 6 of the drawings.

Counterclockwise rotation of the sleeve 84 will once again return the sleeve 84 into the second operative position wherein the traveling nut 96 is engaged upon the periphery of the lead screw 78 on the auxiliary drive shaft 64 and the cycle of operation can be begun once again.

Since there is a fixed ratio between the rotation of the main and auxiliary drive shafts 40 and 64 of the attachment 10, fluctuations in the rate at which the drill bit 16 is fed into the work piece 18 are eliminated and, therefore, controlled and constant feeding of the drill bit 16 into the work piece is accomplished.

I thus provide by my invention an attachment which can be easily utilized in conjunction with various types of hand tools by incorporating the proper adapter collar therein. Furthermore, the drill feeding attachment of my invention permits the use of the drill in either manual or controlled drilling and there is no necessity for demounting the attachment from the hand tool for manual drilling. In addition, the rate of feed of the drill into the work piece during controlled drilling is accurately maintained to prevent injury to the work piece or breakage or premature dulling of the drills.

I claim as my invention:

1. In a tool feeding device for connection to a power source, the combination of: a housing; a main drive shaft in said housing; a tool chuck secured to the outer end of said main drive shaft; power take-off means connected to said main drive shaft; an auxiliary drive shaft driven by said power take-off means; tool feeding means mounted for movement with respect to said housing into engagement with said auxiliary drive shaft; and a longitudinally and rotatably movable feeding foot connected to said tool feeding means and movable thereby to cause relative movement between said tool chuck and said foot, said foot including a sleeve encompassing a portion of said housing.

2. In a tool feeding device for connection to a power source, the combination of: a housing; a main drive shaft in said housing; a tool chuck secured to the outer end of said main drive shaft; power take-off means connected to said main drive shaft; a gear reducer driven by said power take-off means; an auxiliary drive shaft driven by said gear reducer; tool feeding means mounted for movement with respect to said housing into engagement with said auxiliary drive shaft; and a longitudinally and rotatably movable feeding foot connected to said tool feeding means and movable thereby to cause relative movement between said tool chuck and said foot, said foot including a sleeve encompassing a portion of said housing.

3. In a tool feeding device for connection to a power source, the combination of: a housing; a main drive shaft in said housing; a tool chuck secured to the outer end of said main drive shaft; power take-off means connected to said main drive shaft; an auxiliary drive shaft driven by said power take-off means, said auxiliary drive shaft having a lead screw mounted thereupon; tool feeding means mounted for movement with respect to said housing into engagement with said lead screw; and a longitudinally and rotatably movable feeding foot connected to said tool feeding means and movable thereby to cause relative movement between said tool chuck and said foot, said foot including a sleeve encompassing a portion of said housing.

4. In a tool feeding device for connection to a power source, the combination of: a housing; a main drive shaft in said housing; a tool chuck secured to the outer end of said main drive shaft; power take-off means connected to said main drive shaft; a gear reducer driven by said power take-off means; an auxiliary drive shaft driven by said gear reducer, said auxiliary drive shaft having a lead screw mounted thereupon; tool feeding means mounted for longitudinal and rotatable movement with respect to said housing into engagement with said lead screw; and a longitudinally and rotatably movable feeding foot connected to said tool feeding means and movable thereby to cause relative movement between said tool chuck and said foot, said foot including a sleeve encompassing a portion of said housing.

5. In a tool feeding device for connection to a power source, the combination of: a housing; a main drive shaft in said housing; power take-off means on said main drive shaft; a tool chuck rotatable by said main drive shaft; an auxiliary drive shaft rotatable by said power take-off means, said auxiliary drive shaft having a lead screw thereupon; tool feeding means mounted for rotary movement and longitudinal movement with respect to said housing into engagement with said auxiliary drive shaft lead screw to cause relative movement between said tool chuck and said tool feeding means, said tool feeding means including a traveling nut engageable with said lead screw; and a rotatably and longitudinally movable sleeve having a pressure foot on one end and encompassing said housing to support said traveling nut for reciprocating and rotary movement.

6. In a tool feeding device for connection to a power source, the combination of: a housing; a main drive shaft in said housing; power take-off means on said main drive shaft; a tool chuck rotatable by said main drive shaft; an auxiliary drive shaft rotatable by said power take-off means, said auxiliary drive shaft having a lead screw thereupon; a movable carrier on said housing; and tool feeding means mounted for movement with said carrier with respect to said housing into engagement with said auxiliary drive shaft lead screw to cause relative movement between said tool chuck and said tool feeding means, said tool feeding means including a traveling nut engageable with said lead screw.

7. In a cutting tool feeding device for connection to a power source, the combination of: a housing; a main drive shaft in said housing; a power take-off on said main drive shaft; a gear reducer connected to said power take-off; an auxiliary shaft driven by said gear reducer, said auxiliary drive shaft being constituted by a lead screw disposed in parallel with said main drive shaft; a pressure foot mounted for reciprocation and rotation on said housing to control the feeding of said cutting tool into a work piece and movable into and out of operative connection with said auxiliary drive shaft, said pressure foot including a sleeve encompassing said housing; and a traveling nut secured to said sleeve and extending into said housing adjacent said lead screw.

8. In a cutting tool feeding device, the combination of: a cylindrical housing having an elongated slot therein; a main drive shaft mounted for rotation in said housing; a power take-off provided on said main drive shaft intermediate the opposite ends thereof, said power take-off being constituted by a worm gear; a gear reducer connected to said worm gear; an auxiliary drive shaft driven by said gear reducer and constituted by a lead screw mounted within said housing and disposed in parallel with said main drive shaft adjacent said slot; an elongated, cylindrical sleeve mounted on the exterior of said housing in overlying relationship with said slot, said sleeve being provided at its forward extremity with a slot, said sleeve being provided at its forward extremity with a pressure foot for engaging a work piece and said sleeve being movable longitudinally with respect to said housing and rotatably thereupon; and a traveling nut secured to said sleeve and extending through said slot, said traveling nut being moved by rotation of said sleeve into operative engagement with said lead screw and being movable longitudinally by said lead screw to cause outward movement of said sleeve with respect to said housing.

9. In a cutting tool feeding device, the combination of: a cylindrical housing having an elongated slot therein; a main drive shaft mounted for rotation in said housing; a power take-off provided on said main drive shaft intermediate the opposite ends thereof, said power take-off being constituted by a worm gear; a gear reducer connected to said worm gear; an auxiliary drive shaft driven by said gear reducer and constituted by a lead screw mounted within said housing and disposed in parallel with said main drive shaft adjacent said slot; an elongated, cylindrical sleeve mounted on the exterior of said housing in overlying relationship with said slot, said sleeve being provided at its forward extremity with a pressure foot for engaging a work piece and said sleeve being movable longitudinally with respect to said housing and rotatably thereupon; a traveling nut secured to said sleeve and extending through said slot, said traveling nut being moved by rotation of said sleeve into operative engagement with said lead screw and being movable longitudinally by said lead screw to cause outward movement of said sleeve with respect to said housing; and a spring interposed between an extremity of said housing and said sleeve serving to urge said sleeve outwardly with respect to said housing in a longitudinal direction and to rotate said sleeve to disconnect said traveling nut from operative engagement with said lead screw.

10. In a cutting tool feeding device, the combination of: a cylindrical housing having an elongated slot therein; a main drive shaft mounted for rotation in said housing; a power take-off provided on said main drive shaft intermediate the opposite ends thereof, said power take-off being constituted by a worm gear; a gear reducer connected to said worm gear; an auxiliary drive shaft driven by said gear reducer and constituted by a lead screw mounted within said housing and disposed in parallel with said main drive shaft adjacent said slot; an elongated, cylindrical sleeve mounted on the exterior of said housing in overlying relationship with said slot, said sleeve being provided at its forward extremity with a pressure foot for engaging a work piece and said sleeve being movable longitudinally with respect to said housing and rotatably thereupon; a traveling nut secured to said sleeve and extending through said slot, said traveling nut being moved by rotation of said sleeve into operative engagement with said lead screw and being movable longitudinally by said lead screw to cause outward movement of said sleeve with respect to said housing a spring interposed between an extremity of said housing and said sleeve serving to urge said sleeve outwardly with respect to said housing in a longitudinal direction and to rotate said sleeve to disconnect said traveling nut from operative engagement with said lead screw; and detent means mounted in said housing for engaging said sleeve when said sleeve is rotated to cause said traveling nut to engage said lead screw whereby said spring is prevented from rotating said sleeve into its original position in which said traveling nut is disengaged from said lead screw.

References Cited in the file of this patent

UNITED STATES PATENTS

| | | |
|---|---|---|
| 1,434,964 | Fiorillo | Nov. 7, 1922 |
| 2,358,954 | Verderber | Sept. 26, 1944 |
| 2,488,992 | Taylor | Nov. 22, 1949 |